(12) United States Patent
Lupon et al.

(10) Patent No.: US 9,329,848 B2
(45) Date of Patent: May 3, 2016

(54) MECHANISM FOR FACILITATING DYNAMIC AND EFFICIENT FUSION OF COMPUTING INSTRUCTIONS IN SOFTWARE PROGRAMS

(71) Applicants: Marc Lupon, Barcelona (ES); Raul Martinez, Badalona (ES); Enric Gibert Codina, Sant Cugat del Vallès (ES); Kyriakos A. Stavrou, Barcelona (ES); Grigorios Magklis, Barcelona (ES); Sridhar Samudrala, Austin, TX (US)

(72) Inventors: Marc Lupon, Barcelona (ES); Raul Martinez, Badalona (ES); Enric Gibert Codina, Sant Cugat del Vallès (ES); Kyriakos A. Stavrou, Barcelona (ES); Grigorios Magklis, Barcelona (ES); Sridhar Samudrala, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,956

(22) PCT Filed: Mar. 27, 2013

(86) PCT No.: PCT/ES2013/070209
§ 371 (c)(1),
(2) Date: Aug. 6, 2014

(87) PCT Pub. No.: WO2014/154917
PCT Pub. Date: Oct. 2, 2014

(65) Prior Publication Data
US 2015/0026671 A1    Jan. 22, 2015

(51) Int. Cl.
*G06F 9/45* (2006.01)

(52) U.S. Cl.
CPC .............. *G06F 8/443* (2013.01); *G06F 8/4432* (2013.01); *G06F 8/4434* (2013.01); *G06F 8/4441* (2013.01); *Y02B 60/181* (2013.01)

(58) Field of Classification Search
None
See application file for complete search history.

(56) References Cited

U.S. PATENT DOCUMENTS

| | | | | |
|---|---|---|---|---|
| 5,392,228 A | * | 2/1995 | Burgess | G06F 7/485 708/205 |
| 6,889,318 B1 | * | 5/2005 | Wichman | G06F 9/3853 712/226 |
| 7,039,909 B2 | * | 5/2006 | Wu | G06F 8/445 717/127 |
| 9,081,561 B2 | * | 7/2015 | Chow | G06F 9/3001 |
| 2003/0236967 A1 | * | 12/2003 | Samra | G06F 9/3853 712/210 |
| 2004/0128485 A1 | * | 7/2004 | Nelson | G06F 9/30032 712/218 |
| 2004/0139429 A1 | * | 7/2004 | Ronen | G06F 9/3001 717/159 |
| 2008/0092124 A1 | * | 4/2008 | Archambault | G06F 8/445 717/140 |
| 2010/0115248 A1 | * | 5/2010 | Ouziel | G06F 9/3853 712/226 |

(Continued)

OTHER PUBLICATIONS

PCT/ES2013/070209, "Notification of Transmittal of the International Search Report and the Written Opinion of the International Searching Authority, or the Declaration" mailed Jan. 14, 2014, pp. 10.

(Continued)

*Primary Examiner* — Wei Zhen
*Assistant Examiner* — Hossain Morshed
(74) *Attorney, Agent, or Firm* — Blakely, Sokoloff, Taylor & Zafman LLP

(57) ABSTRACT

A mechanism is described for facilitating dynamic and efficient fusion of computing instructions according to one embodiment. A method of embodiments, as described herein, includes monitoring a software program for a program region having fusion candidate instructions for a fusion operation at a computing system; evaluating whether the macro operation of the candidate instructions is valuable to the software program; and performing the fusion operation if it is evaluated to be valuable.

20 Claims, 8 Drawing Sheets

(56) References Cited

U.S. PATENT DOCUMENTS

| | | | | |
|---|---|---|---|---|
| 2010/0299505 A1* | 11/2010 | Uesugi | ............... | G06F 9/3893 712/221 |
| 2011/0072066 A1* | 3/2011 | Lutz | ............... | G06F 7/483 708/497 |
| 2011/0296146 A1* | 12/2011 | Anand | ............... | G06F 9/3001 712/222 |
| 2013/0173452 A1* | 7/2013 | O'Connor | ............... | G06F 17/5009 705/38 |
| 2013/0311754 A1* | 11/2013 | Brown | ............... | G06F 9/3867 712/216 |
| 2014/0046535 A1* | 2/2014 | Hinnant, Jr. | ............... | G01M 5/0016 701/34.4 |
| 2014/0047221 A1* | 2/2014 | Irwin | ............... | G06F 9/30181 712/226 |
| 2015/0026671 A1* | 1/2015 | Lupon | ............... | G06F 8/443 717/153 |

OTHER PUBLICATIONS

Leupers, R., et al: "Instruction selection for embedded DSPs with complex instructions", Proceedings of EURO-DAC '96: European Design Automation Conference With EURO-VDL '96 and Exhibition. Geneva, Sep. 16-20, 1996; [Proceedings of EURO-DAC : European Design Automation Conference With EURO-VDL and Exhibition], Los Alamitos, IEEE Comp., Sep. 16, 1996, pp. 200-205, XP010198599, DOI: 10.1109/EURDAC.1996.558205 ISBN: 978-0-8186-7573-7.

Lua Y-S et al: "Optimal subgraph covering for customisable VLIW processors", IET Computers and Digital Techniques, vol. 3, No. 1, Jan. 12, 2009, pp. 14-23, XP006032326, ISSN:1751-861X, DOL: 10.1049/IET-CDT:20070104.

* cited by examiner

US 9,329,848 B2

MECHANISM FOR FACILITATING DYNAMIC AND EFFICIENT FUSION OF COMPUTING INSTRUCTIONS IN SOFTWARE PROGRAMS

CROSS-REFERENCE TO RELATED APPLICATION

This patent application is a U.S. National Phase Application under 35 U.S.C. §371 of International Application No. PCT/ES2013/070209, filed Mar. 27, 2013, entitled MECHANISM FOR FACILITATING DYNAMIC AND EFFICIENT FUSION OF COMPUTING INSTRUCTIONS IN SOFTWARE PROGRAMS by Marc LUPON, et al., the benefit and priority are claimed thereof and the entire contents of which are incorporated herein by reference.

FIELD

Embodiments described herein generally relate to computer programming. More particularly, embodiments relate to a mechanism for facilitating dynamic and efficient fusion of computing instructions in software programs.

BACKGROUND

Fused instructions (e.g., Combined FP Multiply-Add ("CMULADD"), etc.) are commonly performed, but not intelligently or efficiently. Using conventional techniques, a fusion operation is often applied blindly regardless of whether the operation is needed at the time. Further, when encountering multiple fusion opportunities, fusion operations are indiscriminately performed because none of the conventional techniques provides for an appropriate prioritization, wasting a significant amount of time and resources.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide a macro fusion mechanism for facilitating dynamic and efficient fusion of computing instructions. The conventional fusion of combination of multiple instructions is not always regarded as profitable with regard to time, power, or performance. Conventional fusion can take more cycles than the execution time of the operations to fuse and may end up increasing the critical path of the executed code as well as the time and energy spent in the sequence. Furthermore, conventional hardware- or software-based solutions are inflexible and unintelligent and they are applied blindly and indiscriminately further complicating the processes as inappropriate and/or untimely fusion operations may be performed, further negatively affecting performance.

Embodiments provide a macro fusion mechanism for facilitating dynamic and efficient fusion of computing instructions, where the mechanism may be integrated into a dynamic binary optimizer or a compiler (e.g., Just-In-Time ("JIT") Compiler) or may be generalized to be included or represented as a static compiler or provided in other macro fusion forms.

Macro fusion may refer to a dynamic, intelligent, and efficient joining or combining of programming computation sequences into a single instruction. Macro fusion may be performed by the mechanism which can be incorporated into, but not limited to, a static compiler, a hardware unit in a core front-end to dynamically fuse sequences of instructions, a dynamic binary optimizer or a JIT compiler, etc. For brevity, clarity and ease of understanding, CMULADD instructions are used as examples throughout the document and that embodiments are not limited to only such instructions and are applicable to any number and type of computing instructions (such as CMULADD, Combined FP Multiply-Subtract ("CMULSUB"), 3-sourced Integer Addition ("ADD3"), Packed Integer Multiply-Add ("XMA"), Fused Multiply-Add ("FMA"), Fused Multiply-Subtract ("FMS"), etc.) provided by, for example, an industry standard architecture (ISA) or in an internal instruction set on a co-designed hardware ("HW")/software ("SW") processor (such that in case when fusion is applied by a dynamic binary optimizer and where the fusion instructions are not incorporated in the ISA, the machine may be used to execute them).

Figure 1:
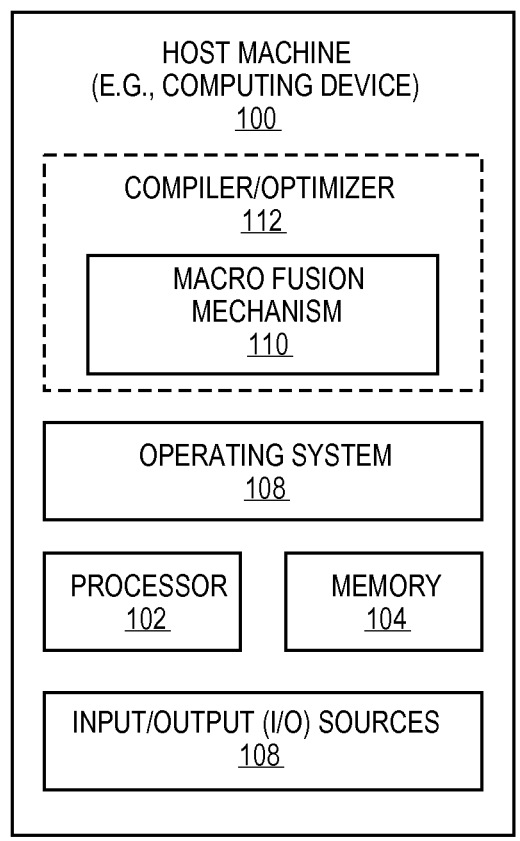
FIG. 1 illustrates a macro fusion mechanism for facilitating dynamic and efficient fusion of computing instructions employed at a computing device according to one embodiment.

FIG. 1 illustrates a macro fusion mechanism 110 for facilitating dynamic and efficient fusion of computing instructions employed at a computing device 100 according to one embodiment. Computing device 100 serves as a host machine to employ macro fusion mechanism 110, which, in one embodiment, provides a macro fusion optimization pass that may include software, hardware, or any combination thereof, such as firmware, and be in communication with or employed at or integrated within a dynamic optimizer or a compiler 112 (e.g., JIT compiler). Fusion mechanism 110 enables efficient and precise fusion of instructions with speculative execution support by working with the available hardware and software to allow a processor 102 to, for example, speed up its compiled software applications including those that may require precise Multiply-Add sequences.

Computing device 100 may include mobile computing devices, such as cellular phones including smartphones (e.g., iPhone® by Apple®, BlackBerry® by Research in Motion®, etc.), personal digital assistants (PDAs), etc., tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "host", "server", "memory server", "machine", "device", "computing device", "computer", "computing system", and the like, may be used interchangeably throughout this document.

Figure 2A:
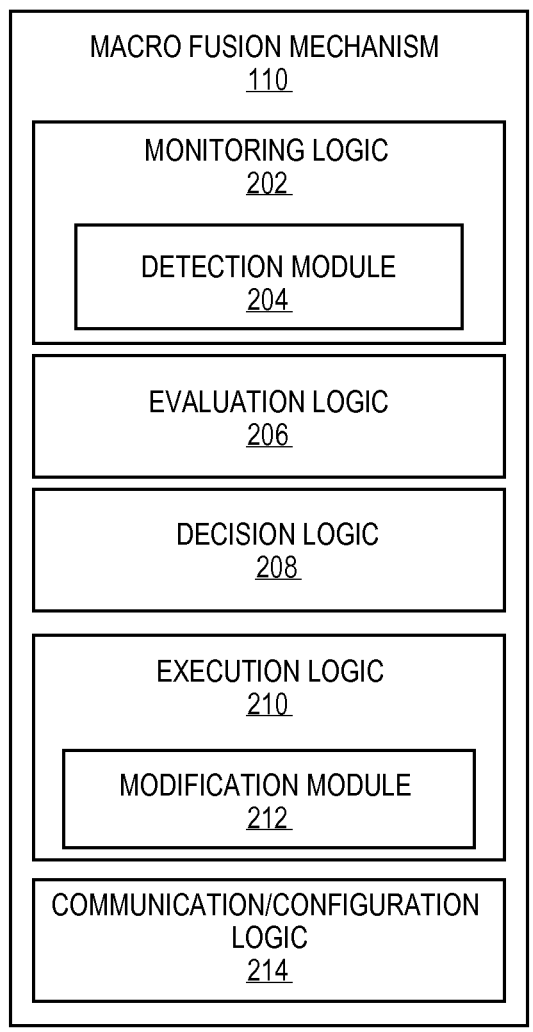
FIG. 2A illustrates fusion mechanism according to one embodiment.

FIG. 2A illustrates fusion mechanism 110 according to one embodiment. In one embodiment, fusion mechanism 110 includes a number of components, such as monitoring logic 202 having detection module 204, evaluation logic 206, decision logic 208, execution logic 210 having modification module 212, and communication/compatibility module 214. Throughout this document, "logic" may be interchangeably referred to as "component" or "module" and may include, by way of example, software, hardware, and/or any combination of software and hardware, such as firmware.

Figure 2B:
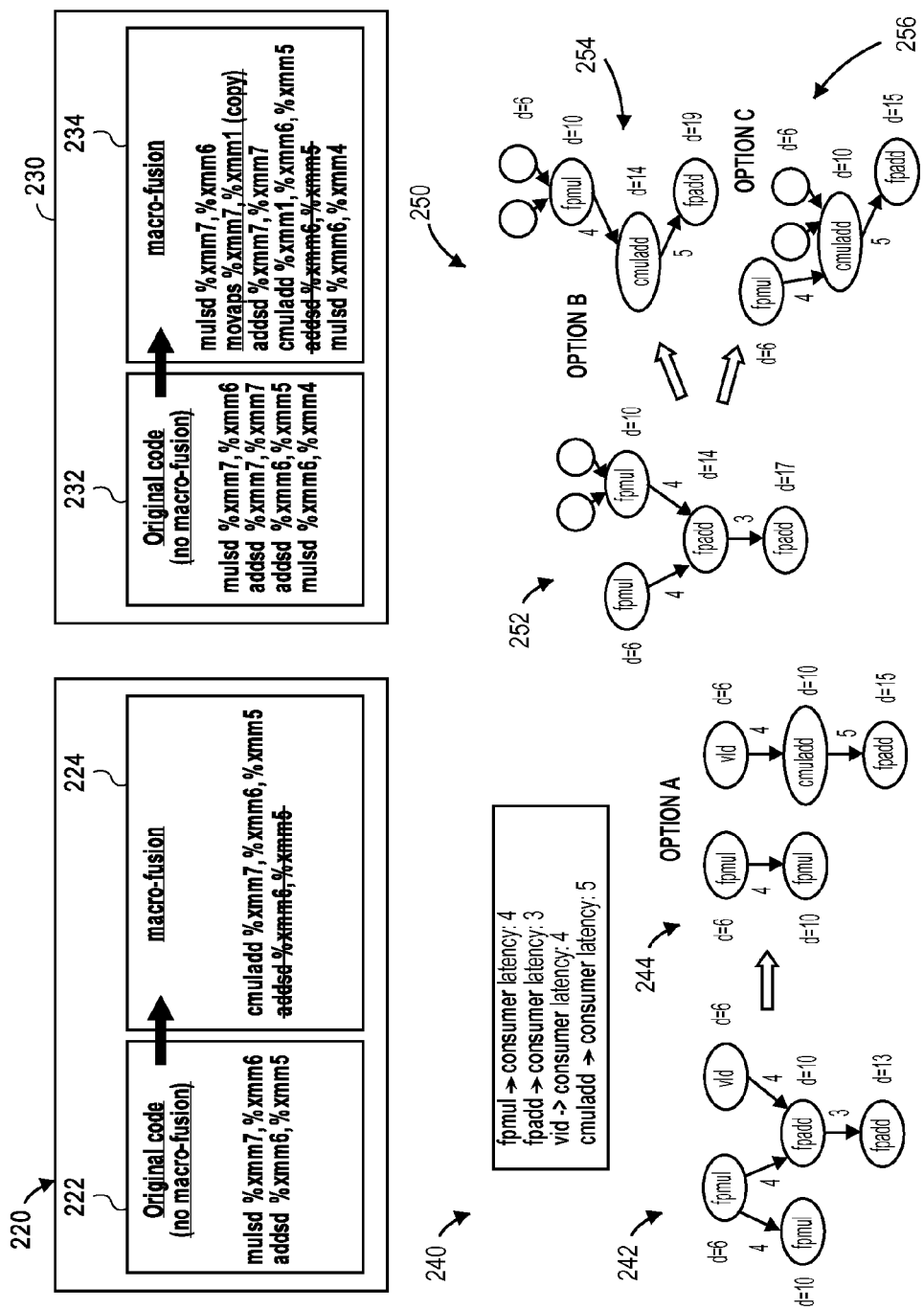
FIG. 2B illustrates macro fusion operations of candidate instructions according to one embodiment.

In one embodiment, monitoring logic 202 continuously monitors a computer program hot code regions where fusion or combination of instructions may be performed. As the program is monitored by monitoring logic 202, its detection module 204 detects any number of operations inside hot code regions to be potential candidates for fusion. As aforementioned, simply because a fusion operation can be performed does not necessary mean the operation is timely or appropriate. For example, an untimely or inappropriate or even a high frequency of fusion operations may unnecessarily consume power, waste time, and/or compromise performance of the software program. Macro fusion of candidate instructions is illustrated in FIG. 2B. To avoid such issues, in one embodiment, once a hot code region having one or more pending or anticipated fusion operations is detected, it is forwarded on to evaluation logic 206 to evaluate the fusion operations.

In one embodiment, evaluation logic 206 evaluates each fusion operation to determine whether it would be profitable to run or execute the fusion operation. Evaluation logic 206 may evaluate all the necessary and relevant information available related to the candidate instructions for fusion. As illustrated with reference to FIG. 3A, in one embodiment, macro fusion mechanism 110 may be placed and triggered just prior to the process of static scheduling 318, such as being performed by fusion pass 316 of FIG. 3A. As fusion is integrated in the scheduling phase 308, precise information about the candidate instructions may be obtained to be evaluated by evaluation logic 206. For example, the necessary and relevant information about the instruction candidates may be obtained prior to software instruction scheduling by the optimizer or compiler and just after a data dependency graph ("DDG") of the hot code region is developed.

In one embodiment, using the precise and relevant information, evaluation logic 206 determines the criticality of each candidate instruction as one of the metrics for measuring the performance benefit or value of the fusing candidate instructions. Furthermore, the triggering of macro fusion mechanism 110 at or around or within one of the last processes of the dynamic binary optimizer/complier, as illustrated in FIG. 4B, the macro fusion pass, as facilitated by macro fusion mechanism 110, is allowed to run on top of traditional code transformations and optimizations, such as data versioning, code elimination, etc. In other words, the macro fusion pass of macro fusion mechanism 110 is triggered after the specialized code is generated, which allows evaluation logic 206 to perform detailed evaluation of each candidate instructions and provide the evaluation results to decision logic 208 to make a confident decision regarding whether each fusion operation should be performed. If a fusion operation is to be performed, the decision is forwarded on to execution logic 210 to perform the operation, where modification module 212 of execution logic 210 perform a necessary set of transformations to DDG and modifications to the instructions' structure to get the instructions ready for conversion. Once the instructions are ready, fusion logic 210 completes the fusion operation of the instructions.

For example, based on the evaluation results as provided by evaluation logic 206 and decided or determined by decision logic 208, once a fusion operation has been proven practical and valuable and right instruction candidates have been chosen to perform the operation, modification module 212 may modify the internal structure of the sequence of fused instructions, so that the sequence may be converted into a combined or fused instruction by execution logic 210. This is further described with reference to FIG. 4B.

For example, a fusion candidate instruction may be regarded as critical if it is detected, by detection module 204, in a critical path of the hot code region. In other words, the depth of the instruction (e.g., distance from the hot code region entry node to the instruction the DDG) plus the height of the instruction (e.g., distance from the instruction to the hot code region exit mode) is equal to the length of the longest dependence chain in the hot code region. The depth and height may be computed, by evaluation logic 206, by adding the latencies of the producer/consumer chains of the instruction following dependencies in the DDG. Further, critical sequences are those formed by chain of dependent critical instructions and in order to provide some flexibility, those instructions that are close to the critical path are treated as pseudo-critical, so evaluation logic 206 takes into account for macro fusion purposes.

In one embodiment, decision logic 208 may decide, based on the evaluation data, to disallow a fusion operation from being performed because performing the operation would hurt the programming process more than it would help, such as causing waste of time, power, and other resources, etc. For example, the macro fusion pass may be temporarily disabled if it is determined by evaluation logic 206 that would be unworthy or not valuable (e.g., in terms of rounding faults, etc.) for a particular hot code region.

As aforementioned, evaluation logic 206 may consider various pieces information relating to candidate instructions prior to forwarding to the evaluation results to decision logic 208. For example, on occasions, two or more instructions when fused together may end up creating more instructions, as shown in FIG. 2B, and thus such fusion may be rejected or allowed to go forward in certain circumstances, such as depending on the characteristics of the candidate instructions or purpose and/or anticipated result of the fusion, etc. In other occasions, fused sequences may execute the same number of instructions of the original code, although they may exercise more hardware components, resulting in an increment of the energy spent in the computation.

Furthermore, detection logic 204 may detect more than one candidate for fusion for a given program instruction. In one embodiment, evaluation logic 206 may consider the benefits of each fusion opportunity and select the most appropriate one taken into consideration the timing, power or performance of individual fused instructions, etc. For instance, if an instruction can be fused with two candidates, the evaluation logic 206 may fuse the sequence that impacts more the critical path of the hot code region. This applies for fusions of the same or different type.

Yet in another embodiment, evaluation logic 206 may not only consider increments of power, but also consider smart heuristic numbers (e.g., using highly-accurate timing simulator, etc.) based on the characteristics of candidate instructions (such as their criticality to the region and/or the overall program, number of relevant consumers, etc.) to allow for intelligent and confident power/performance-guided decisions to save power and increase performance (as indicated from latency cycles and further illustrated with reference to FIG. 2B).

FIG. 2B illustrates fusion option according to one embodiment. Fusion option 220 includes an option that may be approved by evaluation logic 206 and decision logic 208 because provides a better option where candidate instructions from original code 222 are fused into a single fused or combined instruction in macro fusion 224. In contrast, fusion option 230 may be evaluated as a bad option by evaluation logic 206 and rejected by decision logic 208 because this does not appear to be a good option as if the fourth candidate instruction from original code 232 are fused in macro fusion 234, they are shown to result in an additional instructions and thus, this option 230 may be rejected.

Similarly, option 240 may be not be considered good by evaluation logic 206 and rejected by decision block 208 of FIG. 2A because macro fusion 244 of original code 242 results in additional path in terms of increased instructions and latency. The smaller numbers illustrated here next to the oval bubbles represent latency cycles. Continuing with latency cycles, option 250 illustrates two possible macro fusion results 254, 256 for the candidate instructions of original code 252. Here, evaluation logic 206 of FIG. 2A may evaluate the two results 254, 256 and, for example, choose result 256 over result 254 because, as illustrated, macro fusion result 254 provides increased length of sequence and adds more latency cycles in comparison with result 256 and thus, result 256 may be regarded as superior and chosen over result 254.

Communication/configuration logic 214 may facilitate the ability to dynamically communicate and stay configured with various dynamic optimizers, compilers, programming codes, instruction and fusion types, etc. Communication/configuration logic 214 further facilitates the ability to dynamically communicate and stay configured with various computing devices (e.g., mobile computing devices (such as various types of smartphones, tablet computers), networks (e.g., Internet, cloud-computing network, etc.), websites, (such as social networking websites (e.g., Facebook®, LinkedIn®, Google+®, etc.)), etc., while ensuring compatibility with changing technologies, parameters, protocols, standards, etc.

It is contemplated that any number and type of components may be added to and/or removed from macro fusion mechanism 110 to facilitate various embodiments including adding, removing, and/or enhancing certain features. For brevity, clarity, and ease of understanding of the macro fusion mechanism 110 many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
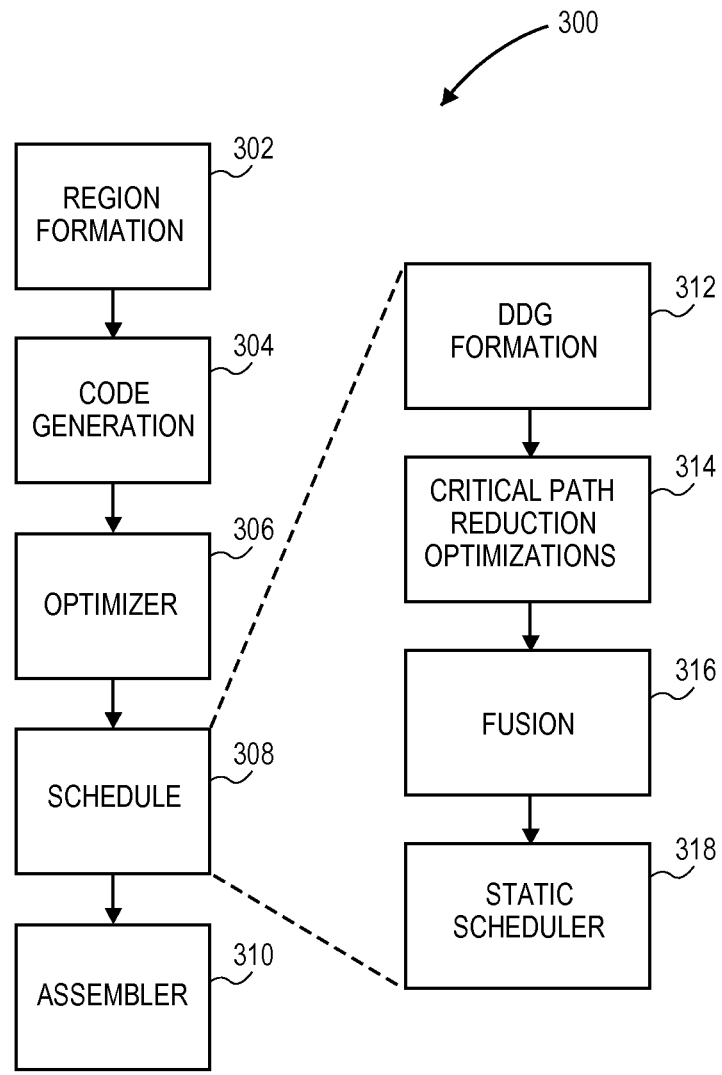
FIG. 3A illustrates a location in an optimizer/compiler process sequence where macro fusion pass of macro fusion mechanism of FIG. 1 is triggered according to one embodiment.

FIG. 3A illustrates a location in an optimizer/compiler process sequence 300 where macro fusion pass of macro fusion mechanism 110 of FIG. 1 is triggered according to one embodiment. For brevity, clarity, and ease of understanding, given that any number and type of optimizer/compiler processes performed by an optimizer/compiler (e.g., dynamic optimizer, JIT compiler, etc.) are well known and therefore they are not discussed here. As aforementioned, in one embodiment, macro fusion 316, as performed by macro fusion mechanism 110 of FIG. 1, is placed at a later stage (in one embodiment, the latest stage) in the sequence 300 so that maximum information about candidate instructions may be obtained in order to perform detailed calculations and achieve intelligent and precise determination regarding whether a fusion operation may be performed or rejected.

For example, sequence 300 lists various optimizer/compiler processes including code formation 302, code generation 304, code optimization 306, code scheduling 308, and code assembly 310. In one embodiment, the code scheduling stage 308, various processes are performed, such as include DDG formation 312, critical path reduction optimization 314 and just prior to static scheduling 318, macro fusion 316 is performed. Macro fusion 316 is further described with reference to FIG. 3B.

Figure 3B:
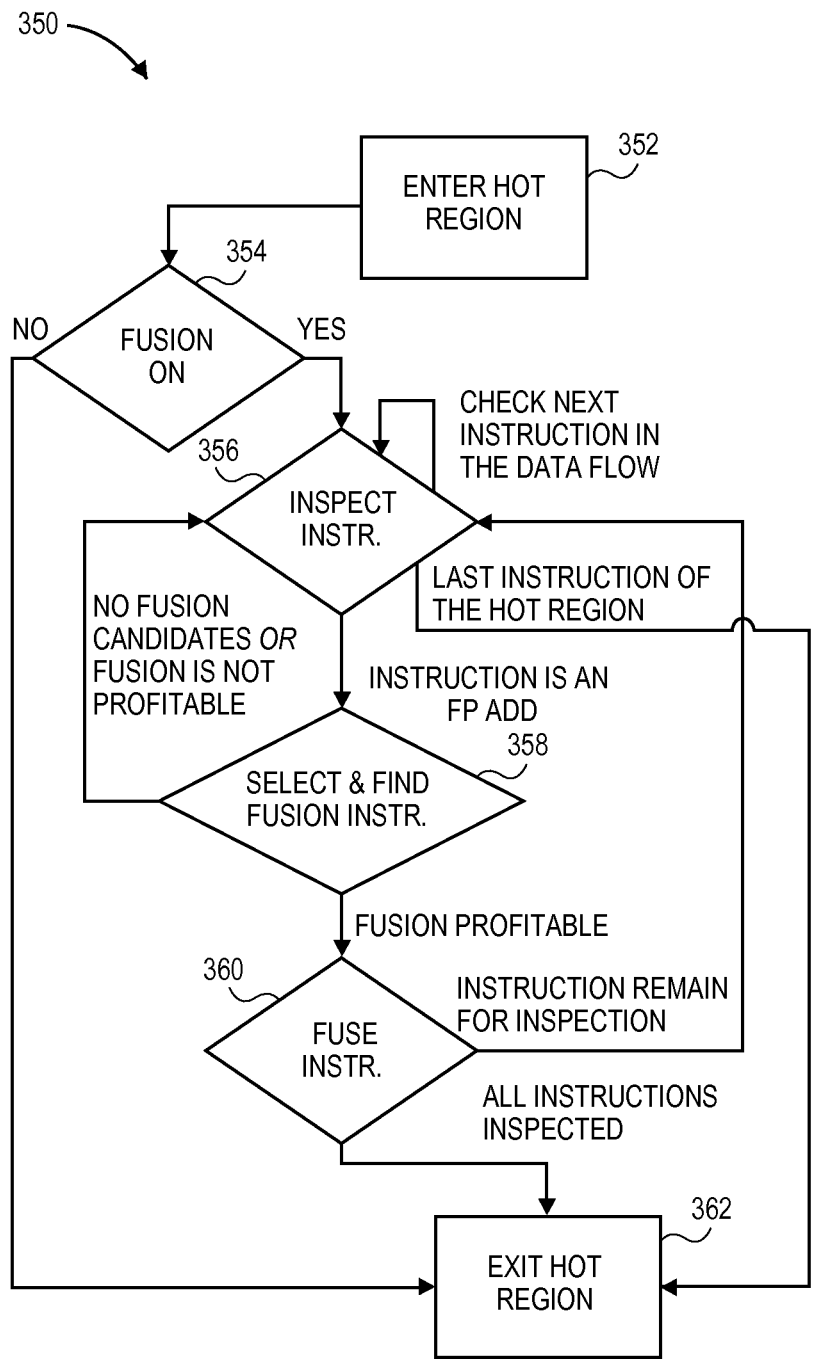
FIG. 3B illustrates a method for facilitating dynamic and efficient macro fusion according to one embodiment.

Referring now to FIG. 3B, it illustrates a method 350 for facilitating dynamic and efficient macro fusion according to one embodiment. Method 350 may be performed by processing logic that may comprise hardware (e.g., circuitry, dedicated logic, programmable logic, etc.), software (such as instructions run on a processing device), or a combination thereof. In one embodiment, method 350 may be performed by macro fusion mechanism 110 of FIG. 1.

Method 350 starts at block 352 with the encountering of or entering into a hot code region of the software program code. In one embodiment, detection module 352 of FIG. 2A goes through the entire program code until it finds a code region with instructions available as candidates for fusion and upon detecting the hot code region, detection module 254 may determine whether macro fusion is enabled or not at block 354. If macro fusion is disabled or not on, the macro fusion pass exits the hot code region at block 362. If, however, macro fusion is on or enabled, at block 356, any candidate instructions are inspected or evaluated.

Upon inspection/evaluation of the candidate instructions, the process moves on to block 358 where those instructions that are to be fused are selected and, at block 360, the instructions are fused to achieve a profitable fusion. The process may then end at block 362 with the exit from the hot code region or the fused instructions remain available for inspection for subsequent fusion operations and the process returns to block 356. Referring back to block 358, if proper candidate instructions are not found (e.g., the fusion is not likely to be profitable), the fusion operation may be denied and the process may continue with block 356. Now referring back to block 356, if the last instruction of the hot code region is detected, the process ends with the exit at block 362. Further, the process may continue to iterate in checking of a next fusion candidate instruction in the data flow at block 356. The process of block 358 is further explored with reference to FIG. 4A. The process of block 360 is further described with reference to FIG. 4B.

Figure 4A:
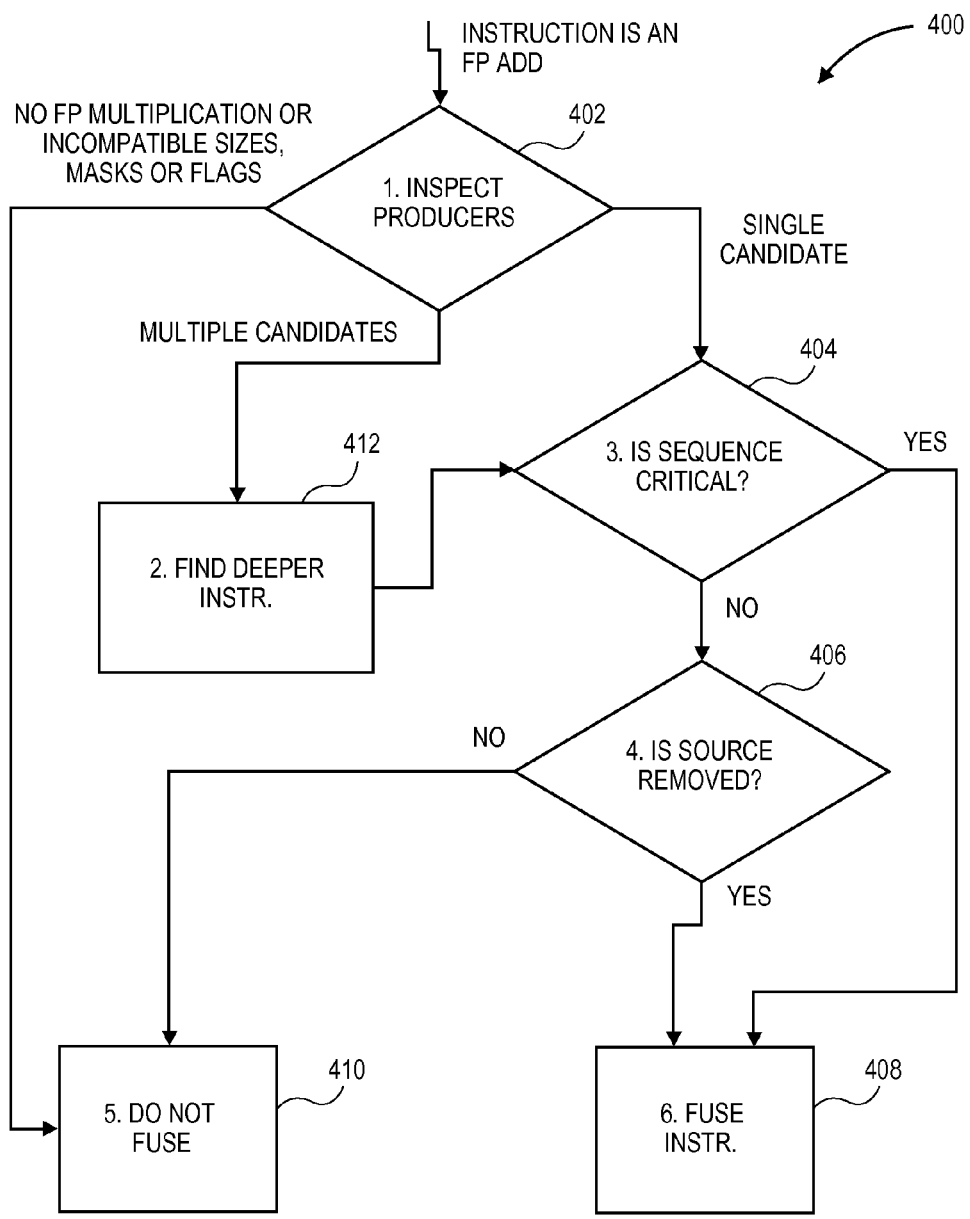
FIG. 4A illustrates a method for facilitating dynamic and efficient macro fusion according to one embodiment.
Figure 4B:
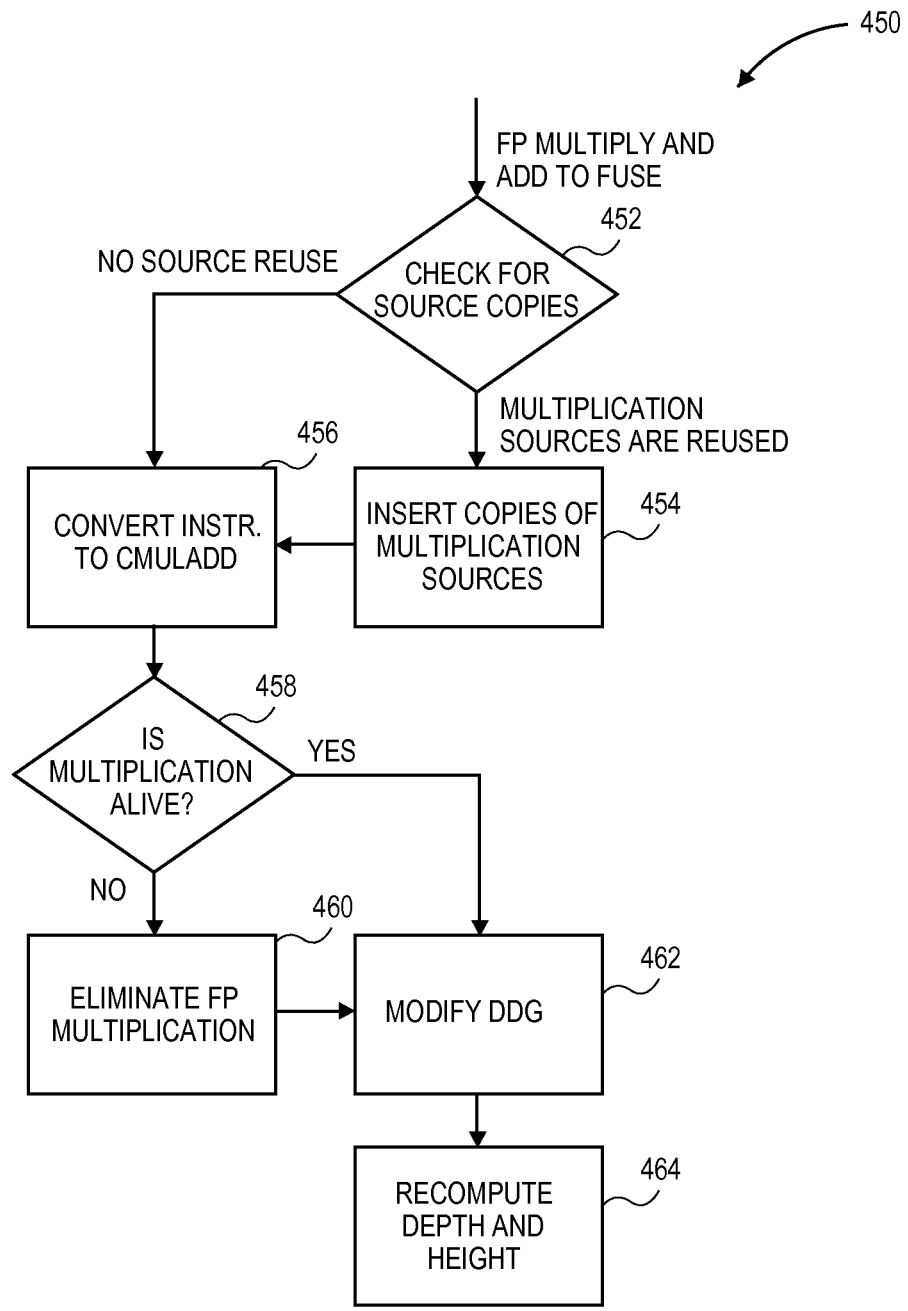
FIG. 4B illustrates a method for facilitating dynamic and efficient macro fusion according to one embodiment.

FIG. 4A illustrates a method 400 for facilitating dynamic and efficient macro fusion according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by macro fusion mechanism 110 of FIG. 1.

Referring back to block 358 of FIG. 3B, the process continues with inspection or detection of producers, such as the candidate instructions or the producers/sources of the candidate instructions at block 402. For convenience and as an embodiment, assume a floating point (FP) add instruction as a candidate for CMULADD fusion. No other fusion is compatible with FP add instructions. If it does not follow an FP multiplication or incompatible sizes, masks or flags are detected, the fusion operation is not performed at block 410. If there are multiple candidate instructions, the process continues with finding a deeper instruction at block 412 and then on to determining whether the sequence is critical at block 404. Referring back to block 402, if there is a single candidate, the process continues at block 404 with determining whether the sequence is critical. If the sequence is critical, the fuse operation is performed on the candidate instruction(s) at block 408. If the sequence is not determined to be critical, another determination is made as to whether the source has been removed at block 406. If yes, the instruction or instructions are fused at block 408. If not, the fuse operation is not performed at block 410.

FIG. 4B illustrates a method 450 for facilitating dynamic and efficient macro fusion according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed by macro fusion mechanism 110 of FIG. 1.

Referring back to block 360 of FIG. 3B, the process continues (e.g., FP multiply and add to fuse) with a check for source copies at block 452. If FP multiplication sources are reused, the process continues with the copies of the multiplication sources being inserted at block 454. If no source is reused, the process continues with conversion of the instructions to a combined multiply-add at block 456. At block 458, a determination is made as to whether multiplication is alive. If not, the FP multiplication is eliminated at block 460. If yes, the DDG may be modified at block 462 (by, for example, modification module 212 of FIG. 2) and the depth and height are then computed at block 464 (by sending it back, for example, to evaluation logic 206 of FIG. 2).

Figure 5:
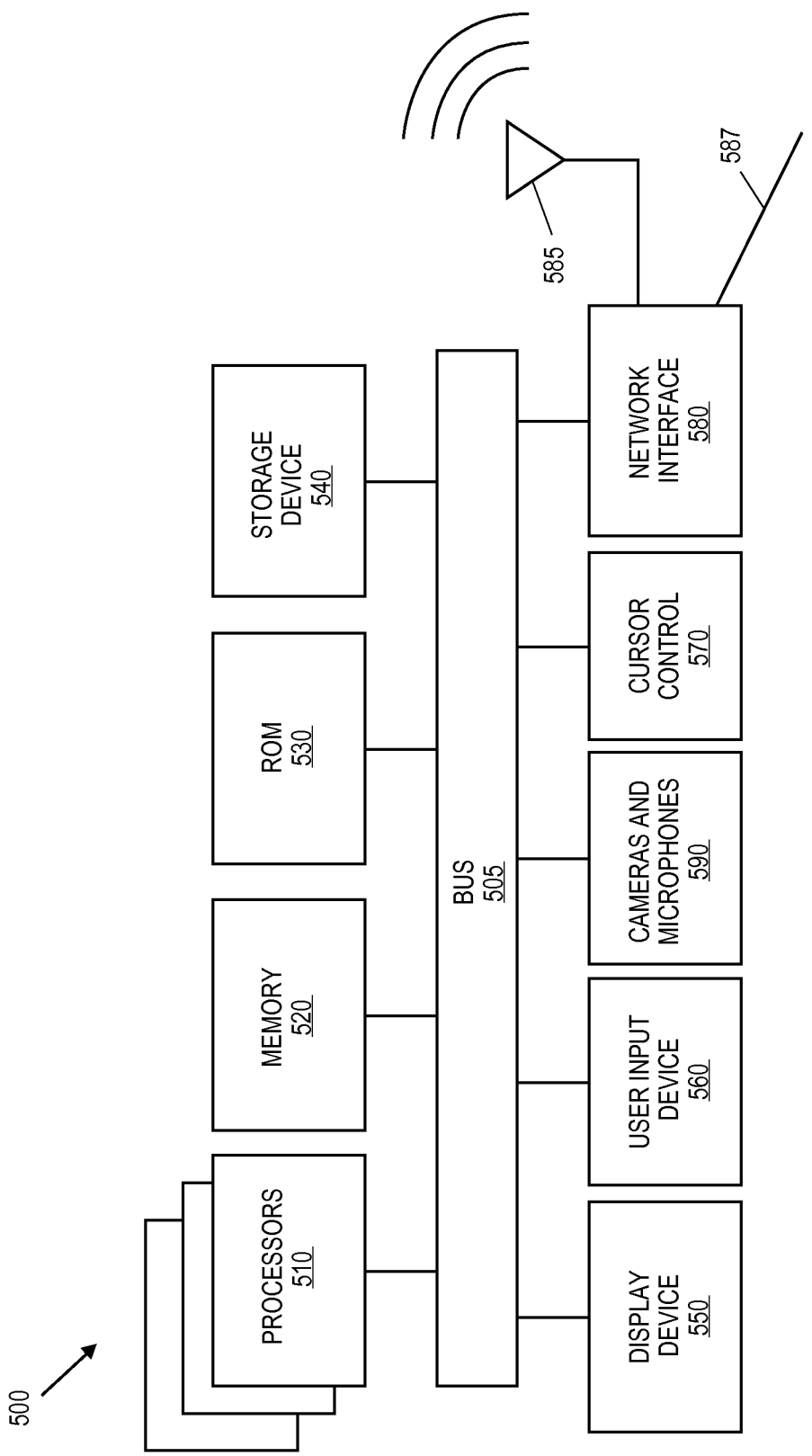
FIG. 5 illustrates computer system suitable for implementing embodiments of the present disclosure according to one embodiment.

FIG. 5 illustrates an embodiment of a computing system 500. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 500 includes bus 505 (or a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: monitoring a software program for a program region having fusion candidate instructions for a fusion operation at a computing system; evaluating whether the macro operation of the candidate instructions is valuable to the software program; and performing the fusion operation if it is evaluated to be valuable.

Embodiments or examples include any of the above methods further comprising allowing the performance of the macro operation upon reviewing results of the evaluation.

Embodiments or examples include any of the above methods further comprising detecting candidate instructions for the fusion operation in the program region.

Embodiments or examples include any of the above methods further comprising rejecting the macro fusion if the fusion operation is evaluated to be not valuable to the software program.

Embodiments or examples include any of the above methods further comprising selecting a most-suited candidate instruction for the fusion operation given a set of potential candidate instructions to be applied on an individual candidate instruction.

Embodiments or examples include any of the above methods further comprising modifying the candidate instructions prior to performing the fusion operation.

Embodiments or examples include any of the above methods wherein the candidate instructions comprise a Combined Multiply-Add (CMULADD) instruction or a Combined Multiply-Subtract (CMULSUB) instruction.

Embodiments or examples include any of the above methods wherein the evaluation is performed in a dynamic binary optimizer or a compiler, wherein evaluating further includes evaluating a data dependency graph (DDG) relating to the candidate instructions to determine depth or length of each candidate instruction to further determine whether the fusion operation is critical to the software program.

Embodiments or examples include any of the above methods wherein the evaluation of the DDG relating to the candidate instructions is further to determine if the fusion operation reduces or increases either a number of executed instructions or an amount of energy spent in the software program.

Embodiments or examples include any of the above methods wherein computing system comprises one or more of a desktop computer, a server computer, a set-top box, a mobile computer including one or more of a smartphone, a personal digital assistant (PDA), a tablet computer, an e-reader, and a laptop computer.

Another embodiment or example includes an apparatus to perform any of the methods mentioned above.

In another embodiment or example, an apparatus comprises means for performing any of the methods mentioned above.

In yet another embodiment or example, at least one machine-readable storage medium comprising a plurality of instructions that in response to being executed on a computing device, causes the computing device to carry out a method according to any of the methods mentioned above.

In yet another embodiment or example, at least one non-transitory or tangible machine-readable storage medium comprising a plurality of instructions that in response to being executed on a computing device, causes the computing device to carry out a method according to any of the methods mentioned above.

In yet another embodiment or example, a computing device arranged to perform a method according to any of the methods mentioned above.

Some embodiments pertain to an apparatus comprising: monitoring logic to monitor a software program for a program region having fusion candidate instructions for a fusion operation at a computing system; evaluation logic to evaluate whether the macro operation of the candidate instructions is valuable to the software program; and execution logic to perform the fusion operation if it is evaluated to be valuable.

Embodiments or examples include any of the above apparatus further comprising decision logic to allow the performance of the macro operation upon reviewing results of the evaluation.

Embodiments or examples include any of the above apparatus wherein the monitoring logic comprises a detection module to detect the candidate instructions for the fusion operation in the program region.

Embodiments or examples include any of the above apparatus wherein the decision logic comprises an evaluation module to reject macro fusion if the fusion operation is evaluated to be not valuable to the software program.

Embodiments or examples include any of the above apparatus wherein the decision logic comprises an evaluation module to select a most-suited candidate instruction for the fusion operation given a set of potential candidate instructions to be applied on an individual candidate instruction.

Embodiments or examples include any of the above apparatus wherein the execution logic comprises a modification module to modify the candidate instructions prior to performing the fusion operation.

Embodiments or examples include any of the above apparatus wherein the candidate instructions comprise a Combined Multiply-Add (CMULADD) instruction or a Combined Multiply-Subtract (CMULSUB) instruction.

Embodiments or examples include any of the above apparatus wherein evaluation is performed in a dynamic binary optimizer or a compiler, wherein the evaluation includes evaluating a data dependency graph (DDG) relating to the candidate instructions to determine depth or length of each candidate instruction to further determine whether the fusion operation is critical to the software program.

Embodiments or examples include any of the above apparatus wherein the evaluation logic is further to evaluate the DDG relating to the candidate instructions to determine if the fusion operation reduces or increases either a number of executed instructions or an amount of energy spent in the software program.

Embodiments or examples include any of the above apparatus wherein computing system comprises one or more of a desktop computer, a server computer, a set-top box, a mobile computer including one or more of a smartphone, a personal digital assistant (PDA), a tablet computer, an e-reader, and a laptop computer.

Some embodiments pertain to a system comprising: a computing device having a memory to store instructions, and a processing device to execute the instructions, the computing device further having a mechanism to: monitor a software program for a program region having fusion candidate instructions for a fusion operation at a computing system; evaluate whether the macro operation of the candidate instructions is valuable to the software program; and perform the fusion operation if it is evaluated to be valuable.

Embodiments or examples include any of the above system wherein the mechanism is further to allow performance of the fusion operation upon reviewing results of the evaluation and detecting the fusion candidate instructions in the program region.

Embodiments or examples include any of the above system wherein the mechanism is further to reject macro fusion if the fusion operation is evaluated to be not valuable to the software program.

Embodiments or examples include any of the above system wherein the mechanism is further to select a most-suited instruction for the fusion operation given a set of potential candidate instructions to be applied on an individual candidate instruction.

Embodiments or examples include any of the above system wherein the mechanism is further to modify the candidate instructions prior to performing the fusion operation, wherein the candidate instructions comprise a Combined Multiply-Add (CMULADD) instruction or a Combined Multiply-Subtract (CMULSUB) instruction.

Embodiments or examples include any of the above system wherein the mechanism is further to perform the evaluation in a dynamic binary optimizer or a compiler, wherein the mechanism is further to evaluate a data dependency graph (DDG) relating to the candidate instructions to determine depth or length of each candidate instruction to further determine whether the fusion operation is critical to the software program.

Embodiments or examples include any of the above system wherein the mechanism is further to evaluate the DDG relating to the candidate instructions to determine if the fusion operation reduces or increases either a number of executed instructions or an amount of energy spent in the software program.

Embodiments or examples include any of the above system wherein computing system comprises one or more of a desktop computer, a server computer, a set-top box, a mobile computer including one or more of a smartphone, a personal digital assistant (PDA), a tablet computer, an e-reader, and a laptop computer.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   at least one processor;
   monitoring logic to monitor a software program for a program region having fusion candidate instructions for a macro fusion operation at the apparatus;
   evaluation logic to evaluate whether the macro fusion operation of the fusion candidate instructions is valuable to the software program;
   wherein the evaluation logic is further to evaluate a data dependency graph (DDG) relating to the fusion candidate instructions to determine depth or length of each fusion candidate instruction to further determine whether the macro fusion operation is critical to the software program, wherein criticality associated with each instructions is used as a metric to measure one or more performance values of one or more of the fusion candidate instructions;

decision logic to allow the macro fusion operation to be performed, upon reviewing results of the evaluation; and execution logic to perform the macro fusion operation if the macro fusion operation is evaluated to be valuable to the software program.

2. The apparatus of claim 1, wherein the monitoring logic comprises a detection module to detect the fusion candidate instructions for the macro fusion operation in the program region.

3. The apparatus of claim 1, wherein the decision logic comprises an evaluation module to reject the macro fusion operation if the macro fusion operation is evaluated to be not valuable to the software program.

4. The apparatus of claim 3, wherein the evaluation module is further to select a most-suited fusion candidate instruction for the macro fusion operation.

5. The apparatus of claim 1, wherein the execution logic comprises a modification module to modify the fusion candidate instructions prior to performing the macro fusion operation.

6. The apparatus of claim 1, wherein the fusion candidate instructions comprise a Combined Multiply-Add (CMULADD) instruction or a Combined Multiply-Subtract (CMULSUB) instruction.

7. The apparatus of claim 1, wherein the evaluation is performed using a dynamic binary optimizer or a compiler.

8. The apparatus of claim 7, wherein the evaluation of the DDG relating to the fusion candidate instructions is further to determine if the macro fusion operation reduces or increases either a number of executed instructions or an amount of energy spent in the software program.

9. The apparatus of claim 1, wherein the apparatus comprises a computing system including one or more of a desktop computer, a server computer, a set-top box, a mobile computer including one or more of a smartphone, a personal digital assistant (PDA), a tablet computer, an e-reader, and a laptop computer.

10. A method comprising:
monitoring a software program for a program region having fusion candidate instructions for a macro fusion operation at a computing system;
evaluating whether the macro fusion operation of the fusion candidate instructions is valuable to the software program;
wherein the evaluation logic is further to evaluate a data dependency graph (DDG) relating to the fusion candidate instructions to determine depth or length of each fusion candidate instruction to further determine whether the macro fusion operation is critical to the software program, wherein criticality associated with each instructions is used as a metric to measure one or more performance values of one or more of the fusion candidate instructions;
allowing the macro fusion operation to be performed, upon reviewing results of the evaluation; and
performing the macro fusion operation if the macro fusion operation is evaluated to be valuable to the software program.

11. The method of claim 10, further comprising:
detecting fusion candidate instructions for the macro fusion operation in the program region;
rejecting the macro fusion operation if the macro fusion operation is evaluated to be not valuable to the software program; and
selecting a most-suited fusion candidate instruction for the macro fusion operation given a set of potential candidate instructions to be applied on an individual candidate instruction.

12. The method of claim 10, further comprising modifying the fusion candidate instructions prior to performing the macro fusion operation, wherein the fusion candidate instructions comprise a Combined Multiply-Add (CMULADD) instruction or a Combined Multiply-Subtract (CMULSUB) instruction.

13. The method of claim 10, wherein the evaluation is performed using a dynamic binary optimizer or a compiler.

14. The method of claim 10, wherein the evaluation of the DDG relating to the fusion candidate instructions is further to determine if the macro fusion operation reduces or increases either a number of executed instructions or an amount of energy spent in the software program.

15. The method of claim 10, wherein the computing device comprises one or more of a desktop computer, a server computer, a set-top box, a mobile computer including one or more of a smartphone, a personal digital assistant (PDA), a tablet computer, an e-reader, and a laptop computer.

16. At least one non-transitory machine-readable medium comprising a plurality of instructions that in response to being executed on a computing device, causes the computing device to carry out one or more operations comprising:
monitoring a software program for a program region having fusion candidate instructions for a macro fusion operation at the computing device;
evaluating whether the macro fusion operation of the fusion candidate instructions is valuable to the software program;
wherein the evaluation logic is further to evaluate a data dependency graph (DDG) relating to the fusion candidate instructions to determine depth or length of each fusion candidate instruction to further determine whether the macro fusion operation is critical to the software program, wherein criticality associated with each instructions is used as a metric to measure one or more performance values of one or more of the fusion candidate instructions;
allowing the macro fusion operation to be performed, upon reviewing results of the evaluation; and
performing the macro fusion operation if the macro fusion operation is evaluated to be valuable to the software program.

17. The non-transitory machine-readable medium of claim 16, further comprising:
detecting fusion candidate instructions for the macro fusion operation in the program region;
rejecting the macro fusion operation if the macro fusion operation is evaluated to be not valuable to the software program; and
selecting a most-suited fusion candidate instruction for the macro fusion operation given a set of potential candidate instructions to be applied on an individual candidate instruction.

18. The non-transitory machine-readable medium of claim 16, further comprising modifying the fusion candidate instructions prior to performing the macro fusion operation, wherein the fusion candidate instructions comprise a Combined Multiply-Add (CMULADD) instruction or a Combined Multiply-Subtract (CMULSUB) instruction.

19. The non-transitory machine-readable medium of claim 16, wherein the evaluation is performed using a dynamic binary optimizer or a compiler,
   wherein the evaluation of the DDG relating to the fusion candidate instructions is further to determine if the macro fusion operation reduces or increases either a number of executed instructions or an amount of energy spent in the software program.

20. The non-transitory machine-readable medium of claim 16, wherein the computing system comprises one or more of a desktop computer, a server computer, a set-top box, a mobile computer including one or more of a smartphone, a personal digital assistant (PDA), a tablet computer, an e-reader, and a laptop computer.

* * * * *